(12) United States Patent
Haddadi et al.

(10) Patent No.: US 10,824,833 B2
(45) Date of Patent: Nov. 3, 2020

(54) OPTICAL POLLING PLATFORM DETECTION SYSTEM

(71) Applicant: AMRITA VISHWA VIDYAPEETHAM, Kollam (IN)

(72) Inventors: Mohammad Reza Haddadi, Kollam (IN); Kamal Bijlani, Kollam (IN)

(73) Assignee: AMRITA VISHWA VIDYAPEETHAM, Kollam (IN)

( * ) Notice: Subject to any disclaimer, the term of this patent is extended or adjusted under 35 U.S.C. 154(b) by 0 days.

(21) Appl. No.: 16/244,938

(22) Filed: Jan. 10, 2019

(65) Prior Publication Data

US 2019/0205586 A1    Jul. 4, 2019

(51) Int. Cl.
| | |
|---|---|
| *G06K 5/04* | (2006.01) |
| *G06K 7/10* | (2006.01) |
| *G06K 7/14* | (2006.01) |
| *G06K 9/46* | (2006.01) |
| *G06K 9/00* | (2006.01) |
| *G06K 9/32* | (2006.01) |

(52) U.S. Cl.
CPC ....... *G06K 7/10722* (2013.01); *G06K 7/1417* (2013.01); *G06K 9/00671* (2013.01); *G06K 9/4604* (2013.01); *G06K 2009/3225* (2013.01)

(58) Field of Classification Search
CPC ....... H04Q 2011/0083; H04Q 11/0005; H04Q 11/0066; H04Q 11/0071; H04Q 2011/0064; H04Q 2011/0073; H04Q 2011/0081; H04Q 11/0062; H04Q 2011/0043; H04Q 11/0478; H04Q 1/24; H04Q 2011/0016; H04Q 2011/0024; H04Q 2011/0033; H04Q 11/0067; H04Q 11/0003; H04Q 2011/0039; H04Q 2011/0094; H04Q 11/00; H04Q 2011/0088
USPC .......... 235/462.11, 462.15; 705/50
See application file for complete search history.

(56) References Cited

U.S. PATENT DOCUMENTS

| | | | |
|---|---|---|---|
| 6,786,412 B2* | 9/2004 | Shimizu | G06K 7/14 235/462.09 |
| 7,555,766 B2* | 6/2009 | Kondo | H04N 7/002 348/64 |

(Continued)

OTHER PUBLICATIONS

Device free personal response system based on fiducial markers as published by http://ieeexplore.ieee.org/ on Mar. 27-30, 2012, p. 87-91 (Year: 2012).*

*Primary Examiner* — Daniel St Cyr
(74) *Attorney, Agent, or Firm* — Convergence Intellectual Property Law P.C.; Jonathan Garfinkel

(57) ABSTRACT

A method and system for an optical polling platform is provided. An optical polling server system receives an image of one or more augmented reality (AR) tag markers associated with a poll. Each AR tag marker is encoded with data, which includes at least a user identifier and a polling option. The system processes the image to identify the one or more AR tag markers in the captured image and detects edges in the image by traversing vertically along image columns. The system identifies potential AR tag markers from final edges based on contrast in pixels of the detected first set of edges and associated neighboring pixels. The AR tag markers are identified from the identified potential AR tag markers by sampling bit areas. Further, the system decodes the one or more AR tag markers to determine user identifier and polling option selected by the user identifier.

20 Claims, 15 Drawing Sheets

(56) References Cited

U.S. PATENT DOCUMENTS

| | | |
|---|---|---|
| 7,769,236 B2 | 8/2010 | Fiala et al. |
| 9,098,731 B1 * | 8/2015 | Amy .................... G06K 9/3208 |
| 2002/0115050 A1 * | 8/2002 | Roschelle ................ G09B 7/00 |
| | | 434/350 |
| 2007/0187512 A1 * | 8/2007 | Yada .................. G06K 7/10544 |
| | | 235/462.11 |
| 2008/0284855 A1 * | 11/2008 | Umeyama .......... H04N 1/00204 |
| | | 348/207.1 |
| 2014/0040928 A1 | 2/2014 | Thies et al. |

* cited by examiner

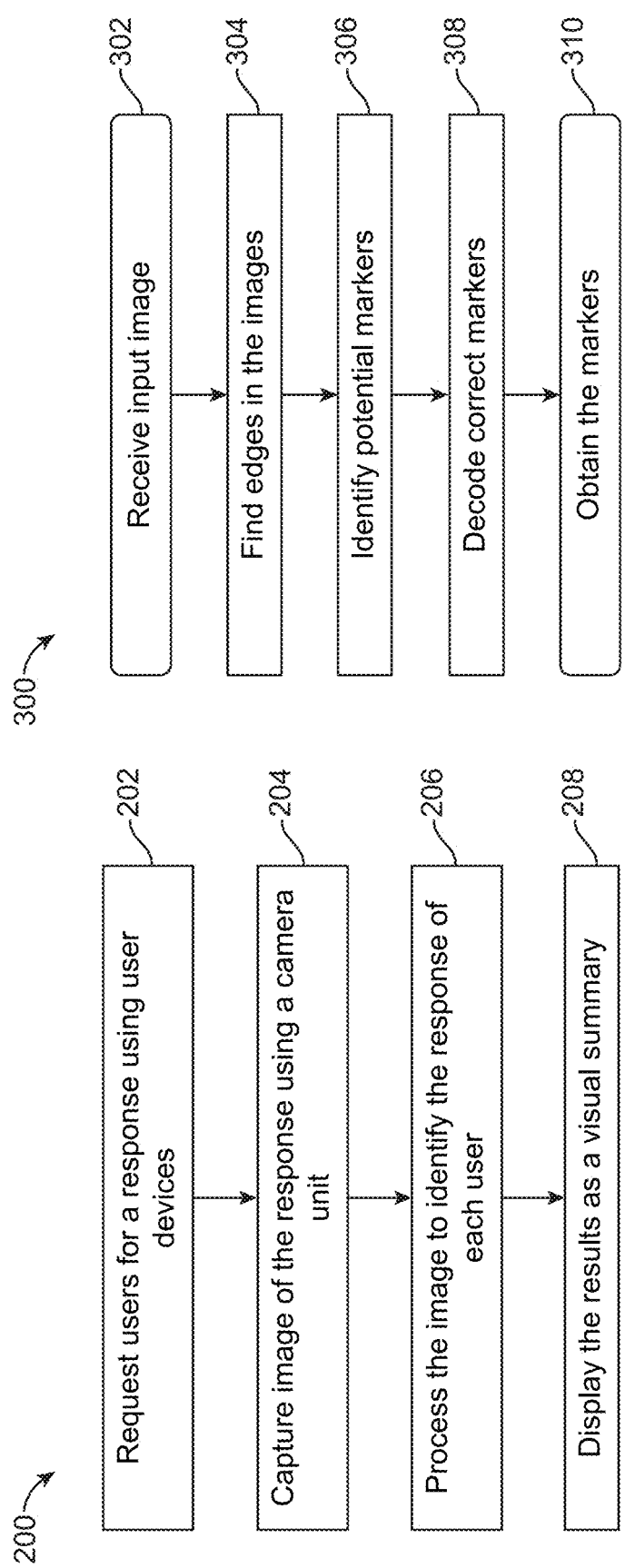

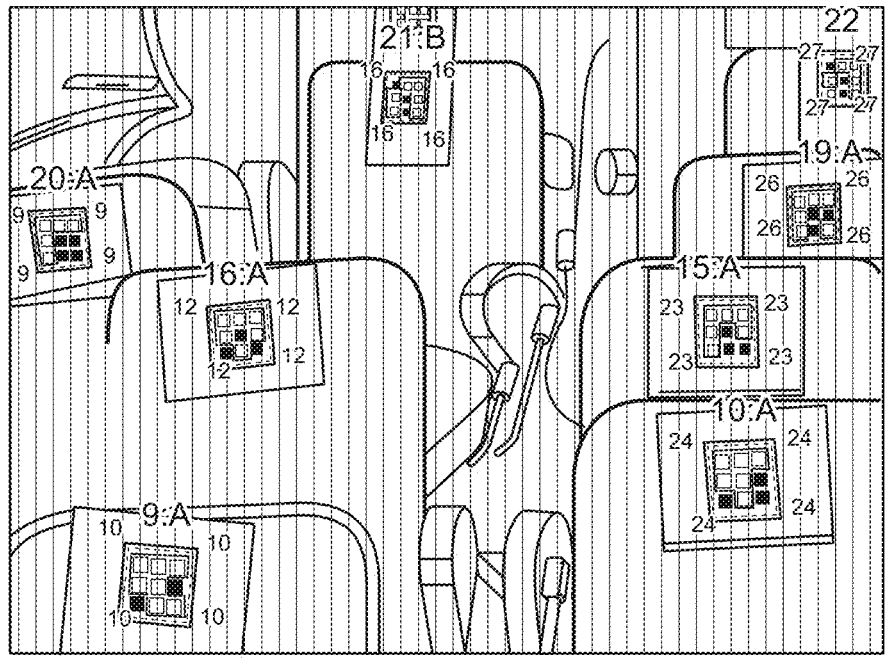
FIG. 14
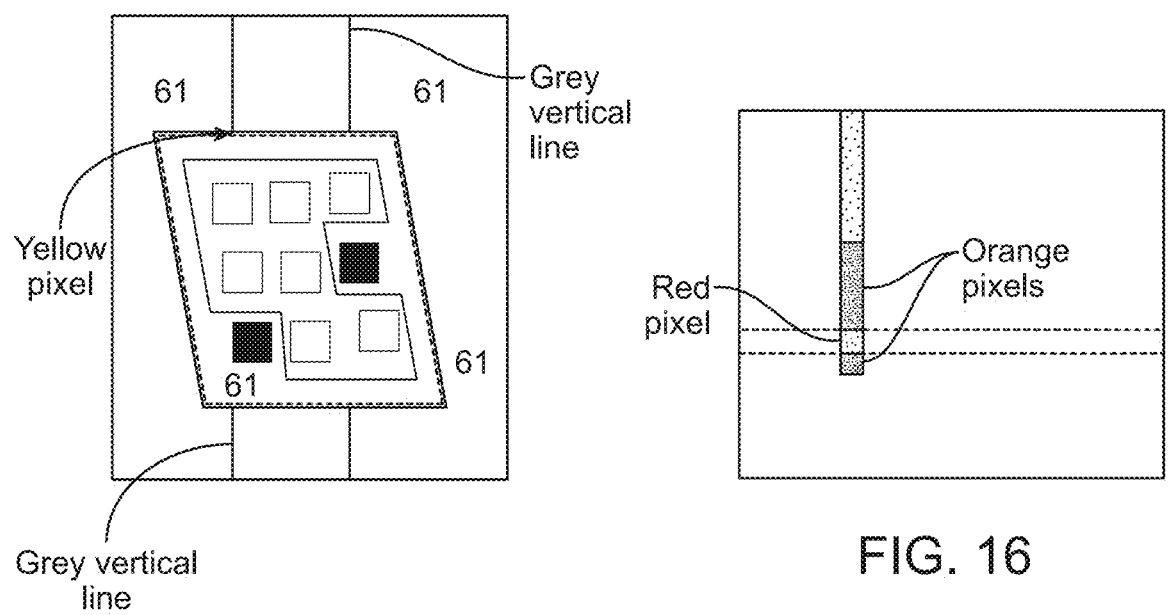
FIG. 15
FIG. 16

OPTICAL POLLING PLATFORM DETECTION SYSTEM

CROSS-REFERENCES TO RELATED APPLICATIONS

The present application claims priority to Indian Patent Application No. 201841001294 filed on Oct. 24, 2018 entitled "OPTICAL POLLING PLATFORM DETECTION SYSTEM", which claims priority to Indian Provisional Patent Application No. 201841001294 entitled "OPTICAL POLLING PLATFORM DETECTION SYSTEM" filed on Jan. 11, 2018, both of which are incorporated herein by reference in its entirety.

FIELD OF THE INVENTION

The disclosure relates generally to an optical polling platform and, in particular, to systems, methods, and devices, for improved optical detection in an optical polling platform.

DESCRIPTION OF THE RELATED ART

Learning Management Systems provide a platform for facilitating delivery and management of e-learning programs. Such systems enable instructors to remotely interact with students in real-time by creating courses, modifying syllabus, delivering lectures, assigning tasks, evaluating students, etc. Although, e-learning and distance education courses have gained immense popularity with the advancement in electronic, communication, and software technologies, there are important ground level hurdles to overcome. For instance, it is increasingly important for instructors to assess the level of understanding of topics among students. Some students may not have grasped the course and may be reluctant to raise queries over camera.

Assessment and evaluation of an audience could provide a status in the progress made in a particular course. Instructors may be able to gauge problems that must be addressed and provide information on how to improve. However, the level of understanding in audience could be better understood when the feedback and assessment methods are quick and instantaneous. Existing assessment systems allow large groups of people to vote on a topic or answer a question. Each person has a device with which selections can be made, or a mobile device that they can use to respond to questions.

Classroom response systems enable plurality of students to wirelessly respond to multiple choice questions submitted by the instructor. In addition to multiple-choice questions some web-based classroom response software, allows questions that require text responses, sketch, and mathematical expression responses. The learning management systems can also be incorporated as a mobile application that can read answers from audience and quickly process them.

Various publications provide such solutions, for example, U.S. Pat. No. 9,098,731B1 (Amy et al.) discloses optical polling platform methods, apparatuses, and media. Similarly, US20140040928A1 (Thies et al.) discloses an audience polling system. Learning management systems in recent times include AR-tag as response devices. For instance, U.S. Pat. No. 7,769,236B2 (Fiala et al.) discloses marker and method for detecting said marker, which may be extended to optical polling systems. In classical AR-detection system, the system first finds the AR-tag's position in space in relation to the camera. This problem is quite complicated as the AR-tag can be oriented in any angle.

Therefore, there is a need for methods and systems that provide an optical polling platform with improved and efficient AR marker identification.

SUMMARY OF THE INVENTION

The present subject matter relates to methods and systems for optical polling and detection.

According to one embodiment of the present subject matter, a computer-implemented optical polling method is provided. The method includes receiving, by a processing unit, an image of augmented reality (AR) tag markers associated with a poll. Each AR tag marker is encoded with data, which includes a user identifier and a polling option. In the next step, the method includes processing the image to identify the AR tag markers by the processing unit. The processing includes detecting a first set of edges in the image by traversing vertically along a plurality of columns in the image, where the columns are separated by a predetermined length. In the next step, the processing includes identifying final edges from the detected first set of edges based on contrast in pixels of the detected first set of edges and associated neighboring pixels. Next, the processing includes identifying potential AR tag markers in the image based on a length of the identified final edges. Subsequently, AR tag markers are identified from the identified potential AR tag markers by sampling bit areas in each of the obtained potential AR tag markers. Further, the method includes decoding the AR tag markers to determine user identifier and polling option selected by the user identifier.

In various embodiments, the predetermined length is less than or equivalent to a minimum AR tag marker length in the image. In various embodiments, detecting the first set of edges includes identifying an edge by traversing every $x^{th}$ column in the image, wherein "x" is minimum AR tag marker length. A line is identified by recursively traversing the identified edge to corners. The side edges of the marker are identified by traversing downwards from corners of the identified line. The method next includes traversing horizontally from an identified bottom corner to another bottom corner. In various embodiments, identifying the final edges includes accepting edge pixels having higher contrast than neighboring pixels; and accepting edge pixels with contrast higher than a threshold value. In various embodiments, the identifying potential AR tag markers includes comparing the length of the final edges with a predetermined minimum AR tag marker length. In the next step, the final edges are rejected if the length is less than the predetermined minimum marker length. The final edges are accepted if the length is greater than the predetermined minimum marker length to obtain the potential AR tag marker. In various embodiments, identifying the AR tag markers from the identified potential AR tag markers comprises: checking whether sampled bit areas are in the same range of either close to white or black color; and checking whether the sampling value match with an actual sampling value. The color of the sampled bit area is one of black or white. In various embodiments, decoding the AR tag markers comprises determining a binary code for each of sampled bit areas based on the color of the sampled bit area and then decoding the binary bit areas in each of the potential AR tag markers based on the position of the most significant bit and the least significant bit in the AR tag markers. In various embodiments, the AR tag markers are identified in poor lighting conditions using adaptive thresholding. In various embodiments, the center of bit representation is calculated to check whether the center is within or outside the edges. In various embodiments, the processing further comprises splitting the received image into multiple parts prior to finding a first set of edges.

According to another embodiment of the present subject matter, an optical polling system is provided. The system includes a camera unit, and a computing device for evaluating and assessing responses. The camera unit is configured to capture an image of augmented reality (AR) tag markers, wherein each AR tag marker is encoded with data, the data comprising a user identifier and a polling option. The computing device may include a processing unit and a memory unit coupled to the processing unit. The memory unit may include an image reception module, an edge detection module, an edge filtering module, a marker identification module, a decoding module. The image reception module is configured to receive the image of AR tag markers. The edge detection module is configured to detect a first set of edges in the image by traversing vertically along a plurality of columns in the image, wherein the columns are separated by a predetermined length. The edge filtering module is configured to identify final edges from the detected first set of edges based on contrast in pixels of the detected first set of edges and associated neighboring pixels. The marker identification module is configured to identify potential AR tag markers based on a length of the identified final edges, and identify AR tag markers from the identified potential AR tag markers by sampling bit areas in each of the obtained potential AR tag markers. The decoding module is configured to decode the AR tag markers to determine user identifier and polling option selected by the user identifier.

In various embodiments, the memory unit further comprises a summary generation module configured to generate a summary of the response of each user. In various embodiments, the memory unit further comprises a learning module configured to provide a plurality of subject courses. In various embodiments, the decoding module is configured to determine a binary code for each of sampled bit areas based on the color of the sampled bit area; and decode the binary bit areas in each of the potential AR tag markers based on the position of the most significant bit and the least significant bit in the AR tag markers. In various embodiments, the second computing device is communicatively coupled to the computing device over a network. In various embodiments, the system is configured to decode AR tag markers for generating summaries at a near real time. In various embodiments, the system comprises a plurality of user devices for responding to the poll conducted in the polling platform, wherein the user devices display the AR tag marker indicating a user identity and user response. In various embodiments, the camera unit is configured to adjust the exposure time based on an average grayscale value of the image. In various embodiments, the memory unit further comprises an image splitting module configured to split the received image prior to finding a first set of edges.

This and other aspects are disclosed herein.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 2 illustrates a method for performing an optical polling on the system network, according to one embodiment of the present subject matter.

FIG. 3 illustrates a method for processing an image to obtain AR markers, according to one embodiment of the present subject matter.

FIG. 14 illustrates image of a plurality of AR tag markers, according to one example of the present subject matter.

FIG. 15 illustrates an image identifying pixel belonging to 'Found Marker', according to one example of the present subject matter.

FIG. 16 illustrates blurry contrast with non-maximum suppression, according to one example of the present subject matter.

DETAILED DESCRIPTION

Figure 1:
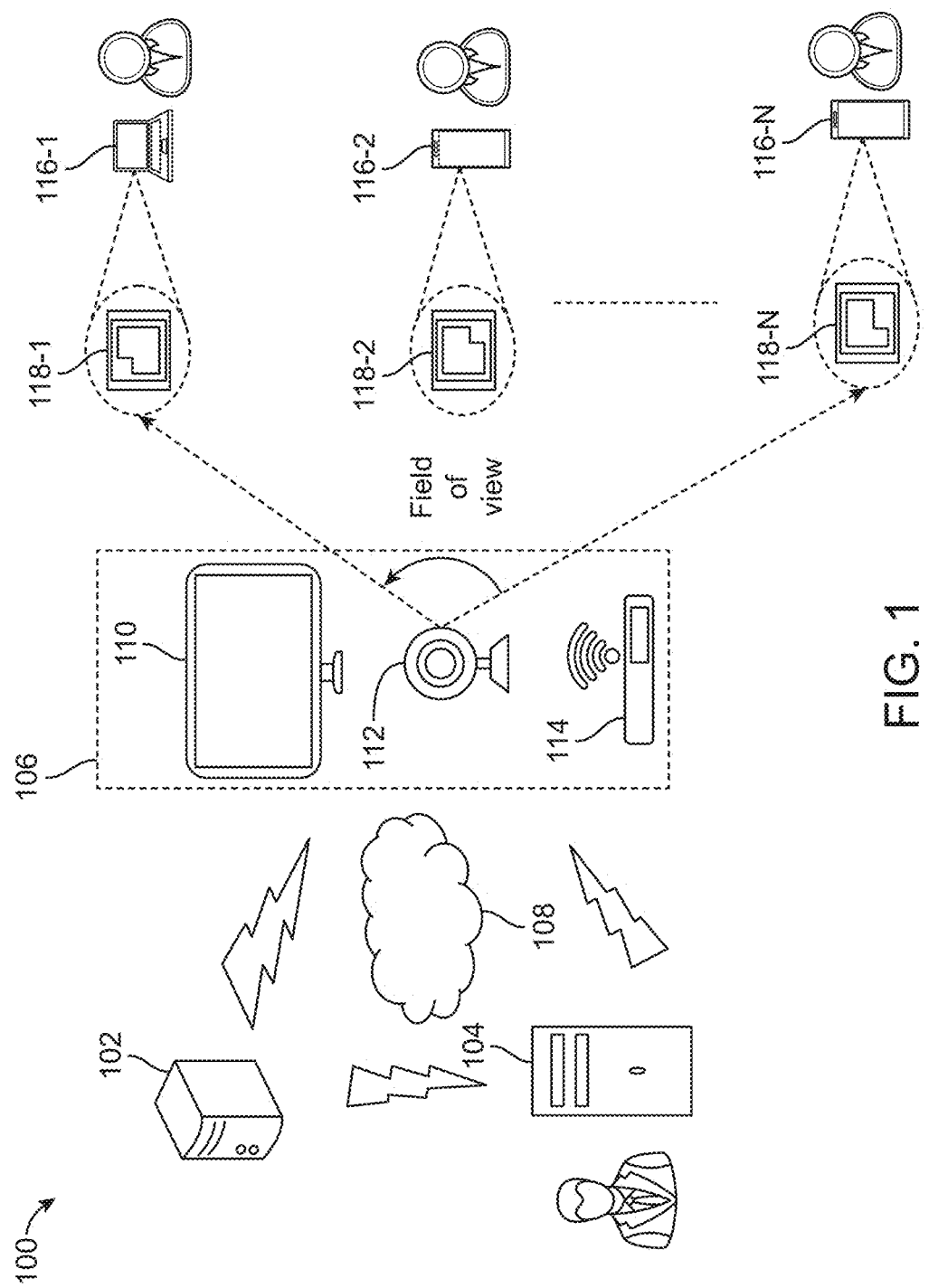
FIG. 1 illustrates an optical polling system network, according to one embodiment of the present subject matter.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on". Referring to the drawings, like numbers indicate like parts throughout the views. Additionally, a reference to the singular includes a reference to the plural unless otherwise stated or inconsistent with the disclosure herein.

As referred to herein, the term "edge" may generally imply a group of adjacent pixels that may, at least to an approximate extent, be aligned horizontally or vertically. The edges may be an outline of a marker and indicative of a transition in terms of a property, such as a color, in the context of the invention. The term "line" may generally refer to an edge, edges identified in a recursive manner, or a collection thereof. In some instances, the terms "edge" and "line" may be interchangeably used unless the context expressly requires.

The various architectural components of the present invention may be distributed across various special purpose or general purpose computing devices, including various hardware components, such as personal computers, servers, laptops, hand-held devices, cell phones or the like, as discussed in greater detail below.

The term "computing device" encompasses devices such as servers, desktop computers, laptop computers, tablet computers, personal digital assistants (PDA), smartphones, mobile phones, smart devices, appliances, sensors, or the like. The computing devices may include processing units, memory units, video or display interfaces, input/output interfaces, video or audio recording units, buses that connect the various units, network interfaces, peripheral interfaces, and the like. It may include any client device or a series thereof that may perform the desired computing operation and may include "rich" devices that are capable of performing a high degree of data processing such as desktop personal computers (PCs) and "thin" clients that are less capable of processing data such as cellular phones and pagers. It is understood that the distinction between a rich client and a thin client is a spectrum; there are many devices (hand-held or Tablet PCs) for example, that fall in the middle of the spectrum. Regardless of the device type or the processing capability of the client, most client devices may be operated by a user in either an online or offline state.

The terms "mobile device", "smart device", "cellular device", and "wireless device" may be used interchangeably and refer to any one of the various cellular telephones, smart phones, multimedia enabled cellular telephones and similar electronic devices capable of sending and receiving wireless communication signals. In an embodiment, the wireless device is a cellular handheld device (e.g., a mobile device), which can communicate via a cellular telephone communication network. The terms "app", "application", "program", and "software" may be used interchangeably and may include standalone applications, SDKs, and modules of applications or operating systems.

Embodiments within the scope of the present invention also include computer-readable media for carrying or having computer-executable instructions or data structures stored thereon. Such computer-readable media can be any available media which can be accessed by a general purpose or special purpose computing device. By way of example, and not limitation, such computer-readable media can be physical storage media such as RAM, ROM, EEPROM, CD-ROM or other optical disk storage, non-volatile storage, magnetic disk storage or other magnetic storage devices, or any other medium which can be used to carry or store desired program code means in the form of computer-executable instructions or data structures and which can be accessed by a general purpose or special purpose computing device. When information is transferred or provided over a network or another communications connection (either hardwired, wireless, or a combination of hardwired or wireless) to a computing device, the computing device properly views the connection as a computer-readable medium. Thus, any such a connection is properly termed a computer-readable medium. Combinations of the above should also be included within the scope of computer-readable media. Computer-executable instructions comprise, for example, instructions and data which cause any general or special purpose computing device to perform a certain function or group of functions.

The invention in its various embodiments proposes optical polling methods, devices, computer program products and systems. The present subject matter also includes a method of generating augmented reality tag markers and various methods to identifying augmented reality tag markers in an image. Additionally included is a method for evaluating and assessing audience in a learning management platform.

An optical polling system environment is illustrated in FIG. 1 according to an embodiment of the present subject matter. The system environment 100 primarily includes an optical polling server 102, a pollster system 104, and a polling system 106 communicating with each other over a network. In various embodiments, the units 102, 104, 106 and other components in FIG. 1 may be computing devices, such as servers, desktop computers, laptop computers, tablet computers, personal digital assistants (PDA), smartphones, mobile phones, smart devices, appliances, sensors, or the like. The computing devices may include processing units, memory units, network interfaces, peripheral interfaces, and the like. Some or all of the components may comprise or reside on separate computing devices or on the same computing device. In some embodiments, the devices may be configured to utilize various communication protocols, such as Global System for Mobile Communications (GSM), General Packet Radio Services (GPRS), Enhanced Data GSM Environment (EDGE), Code Division Multiple Access (CDMA), Wideband Code Division Multiple Access (WCDMA), Bluetooth, High Speed Packet Access (HSPA), Long Term Evolution (LTE), 5G, 5G-New Radio, and Worldwide Interoperability for Microwave Access (Wi-MAX).

The various systems may interact to perform optical polling broadly in a method as illustrated in a flow diagram in FIG. 2, according to one embodiment of the present subject matter. In one embodiment, the method 200 includes requesting users for a response from user devices 118-1 . . . 116-N, as in block 202. The request may be initiated at the pollster system 104 by a pollster, such as a teacher, lecturer, administrator, speaker, or the like. The request may include one or more questions, which may be communicated to the polling system 106 via the optical polling server 102. The polling system 106 may include a display device 110, a camera unit 112, and a network device 114. In one embodiment, the display device 110 is configured to display one or more questions to a plurality of users. In a typical embodiment, the pollster system 104 includes a mobile computing device with a built-in camera unit and installed with an application therein to provide a graphical user interface for detection of AR-tag markers at a near real-time.

In one embodiment, the response from the user devices 116-N is captured in an image or a series of images using the camera unit 112, as in block 204. In one embodiment, the responses to the request is provided using AR tag markers 118-1 . . . , 118-N indicating answers to the question displayed to the users on the display device 110. In some embodiments, the user device 116 is an AR tag marker 118. Each AR tag marker may be encoded with data, such as a response data. In one embodiment, the captured image is communicated to the optical polling server 102 to process to the image to identify the response of each user, as in block 206. In one embodiment, the processed image is then communicated to the pollster system 104 and displayed as a visual summary of the responses from the users, as in block 208.

The processing of the image includes the method steps as illustrated in FIG. 3, according to an embodiment of the present subject matter. The method 300 includes receiving, at the optical polling server 102, the image captured by the camera unit 112 of the polling system 106. The optical polling server 102 processes the image to obtain AR tag markers 118-1, . . . 118-N representing the responses of the users. The processing steps include finding edges in the images at block 304. In other embodiments, an image feature is detected for the images. Based on the found edges, potential markers in the image are identified at block 306. The potential markers may be identified using various techniques, such as non-maximum suppression and adaptive thresholding. The potential markers are decoded at 308 and correct markers are obtained at block 310. In various embodiments, the received image may be split into multiple parts or "cores" prior to finding a first set of edges. For instance, each part may contain a fraction of the columns and each part may be simultaneously used for marker detection in lesser time. Further, the list of "found markers" or "bad lines", which will be discussed later, would be smaller to iterate through for each new line that is detected.

Figure 4:
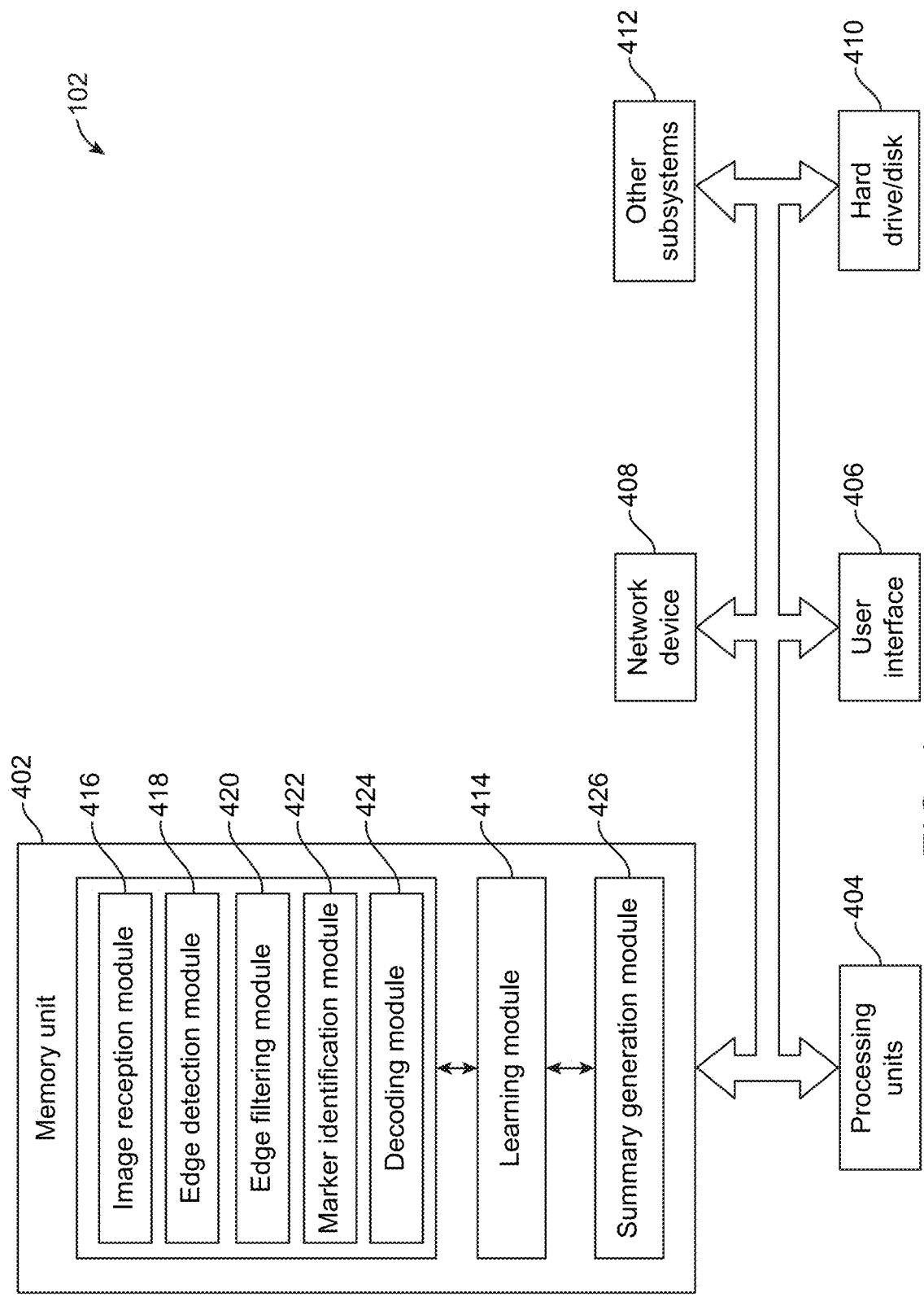
FIG. 4 illustrates system architecture diagram of the optical polling server, according to one embodiment of the present subject matter.

A system architecture diagram of the optical polling server 102 is illustrated in FIG. 4, according to one embodiment of the present subject matter. The optical polling server 102 may include memory unit 402, one or more processing units 404, a user interface 406, a network device 408, hard drive 410 and other subsystems 412. The memory unit 402 may include a learning module 414, an image reception module 416, edge detection module 418, edge filtering module 420, marker identification module 422, and decoding module 424. In some embodiments, the learning module 414 is configured to provide a plurality of subject courses taught by teachers at an educational institution. In various embodiments, the learning module may include lectures, lessons, videos, quizzes, and the like, which may be displayed at the display device 110 based on a user-selection made at the pollster system 104. In some embodiments, the image reception module 416 is configured to receive the image of one or more augmented reality (AR) tag markers 118-1, . . . 118-N captured by the camera unit 112 of the polling system 106. In some embodiments, the edge detection module 418 is configured to detect a first set of edges in the image by traversing vertically along a plurality of columns in the image. The columns may be separated by a predetermined length. In various embodiments, the predetermined length is less than or equivalent to a minimum AR tag marker length in the image. In some embodiments, the edge filtering module 420 is configured to identify final edges from the detected first set of edges based on contrast in pixels of the detected first set of edges and associated neighboring pixels. In some embodiments, the marker identification module 422 is configured to identify one or more potential AR tag markers based on a length of the identified final edges. The marker identification module 422 may then identify one or more AR tag markers by sampling bit areas in each of the obtained potential AR tag markers. In yet other embodiments, the decoding module 424 is configured to decode the one or more AR tag markers to determine user identifier and polling option selected by the user identifier. In some embodiments, the system includes a summary generation module 426 configured to generate a summary of the response of each user.

Figure 5:
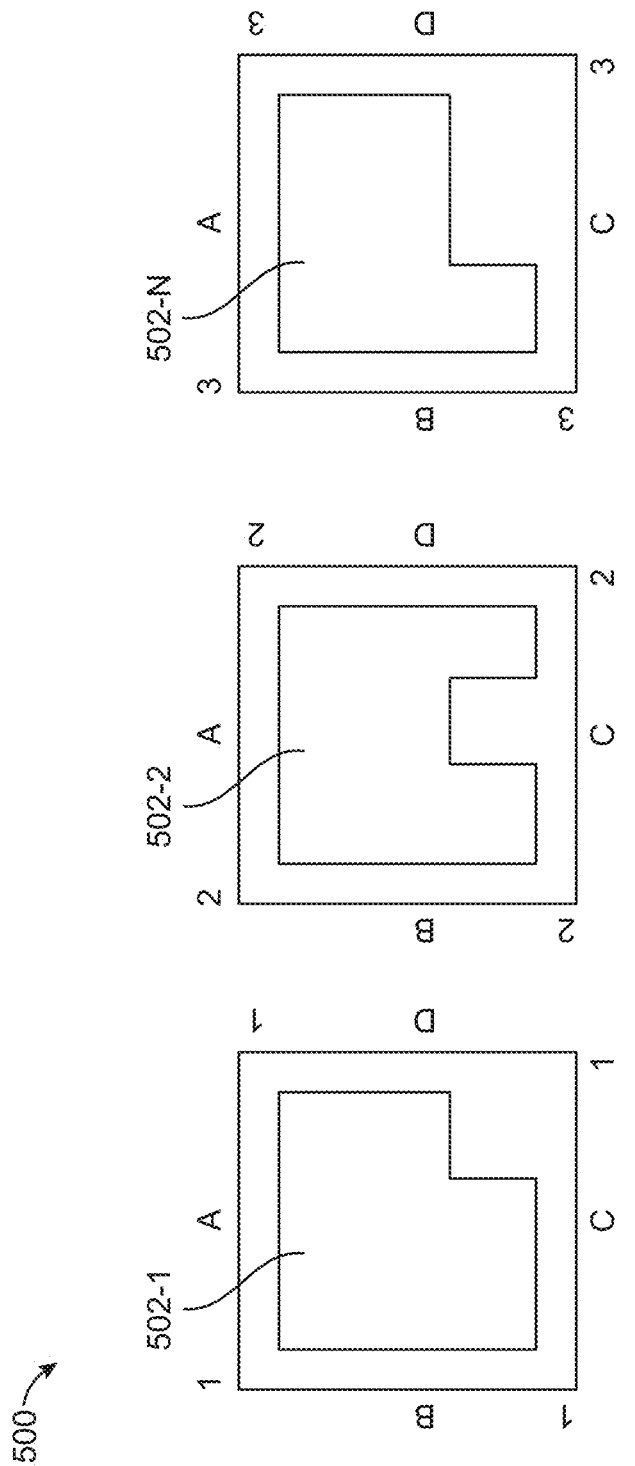
FIG. 5 illustrates AR tag markers of different users, according to one embodiment of the present subject matter.

In various embodiments, the user devices 116-1, . . . 116-N displays AR tag markers of each user as shown in FIG. 5. The AR tag markers 500 may be encoded with a user identifier data and polling options within marker areas 502-1, . . . 502-N of the markers 500. In various embodiments, an AR tag marker may be a printed AR tag marker or a wearable AR tag marker. In one embodiment, the printed AR tag marker may be a sheet of reinforced paper printed with AR marker. In another embodiment, an AR tag may be utilized. In various embodiments, the orientation of the AR tag marker may indicate the polling option selected by the user. The users may provide different answers by rotating the AR tag marker in relation to the camera. In an exemplary embodiment, the polling options comprise A, B, C, and D. In another exemplary embodiment, the answer is indicated by the user facing the camera such that the option corresponding to the user's answer is held on top.

Figure 6:
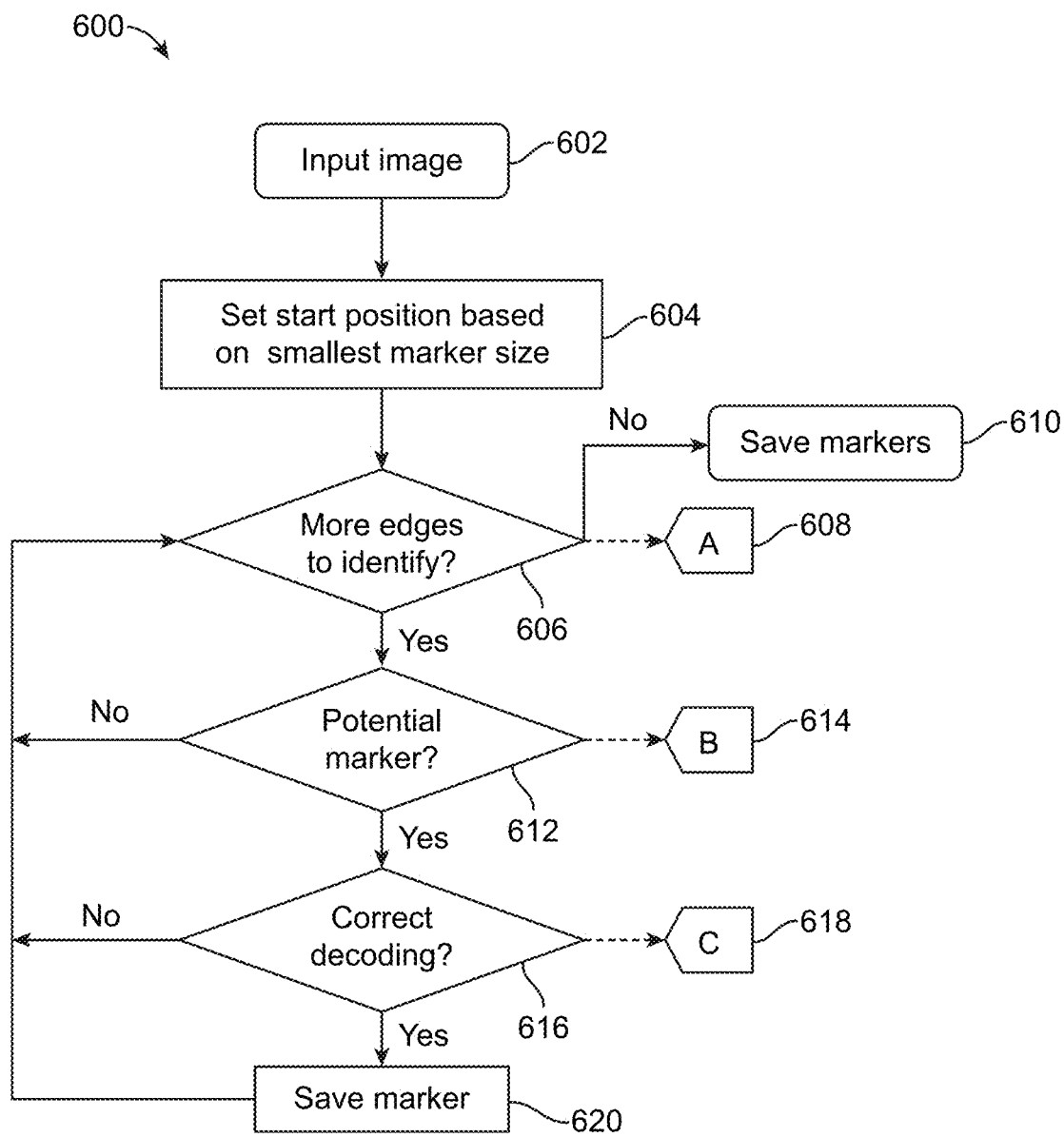
FIG. 6 illustrates overview for identifying the AR tag marker in a flowchart, according to one embodiment of the present subject matter.

An overview of the method of identifying the AR tag marker is illustrated in a flowchart as shown in FIG. 6, according to an embodiment of the present subject matter. The method includes receiving an image of plurality of AR tag markers at 602. A starting point may be set based on the smallest marker size at block 604. In various embodiments, the image is traversed every $x^{th}$ column of pixels, beginning from the starting point, from top to bottom to find horizontal edges. "x" may indicate the set minimum marker length. In some embodiments, the minimum AR tag marker length is at least 15 pixels. The skipping of columns therefore may save around 15 times or higher of the computational cost to find markers. In some embodiments, the method includes checking whether more edges are remaining to be identified at block 606. The horizontal edges may be identified based on edge detection technique, such as a non-maximum suppression technique 608. If there are no more edges to be identified then the markers are saved at block 610. After applying the non-maximum suppression filter, it is checked whether a potential marker is identified at block 612. The potential marker may be identified based on the length of the sides of the markers using various techniques at block 614. On identifying the potential markers, AR tag markers may be sampled to determine whether the AR tag marker can be decoded at 618. The markers may be saved after decoding the marker at block 620.

Figure 7:
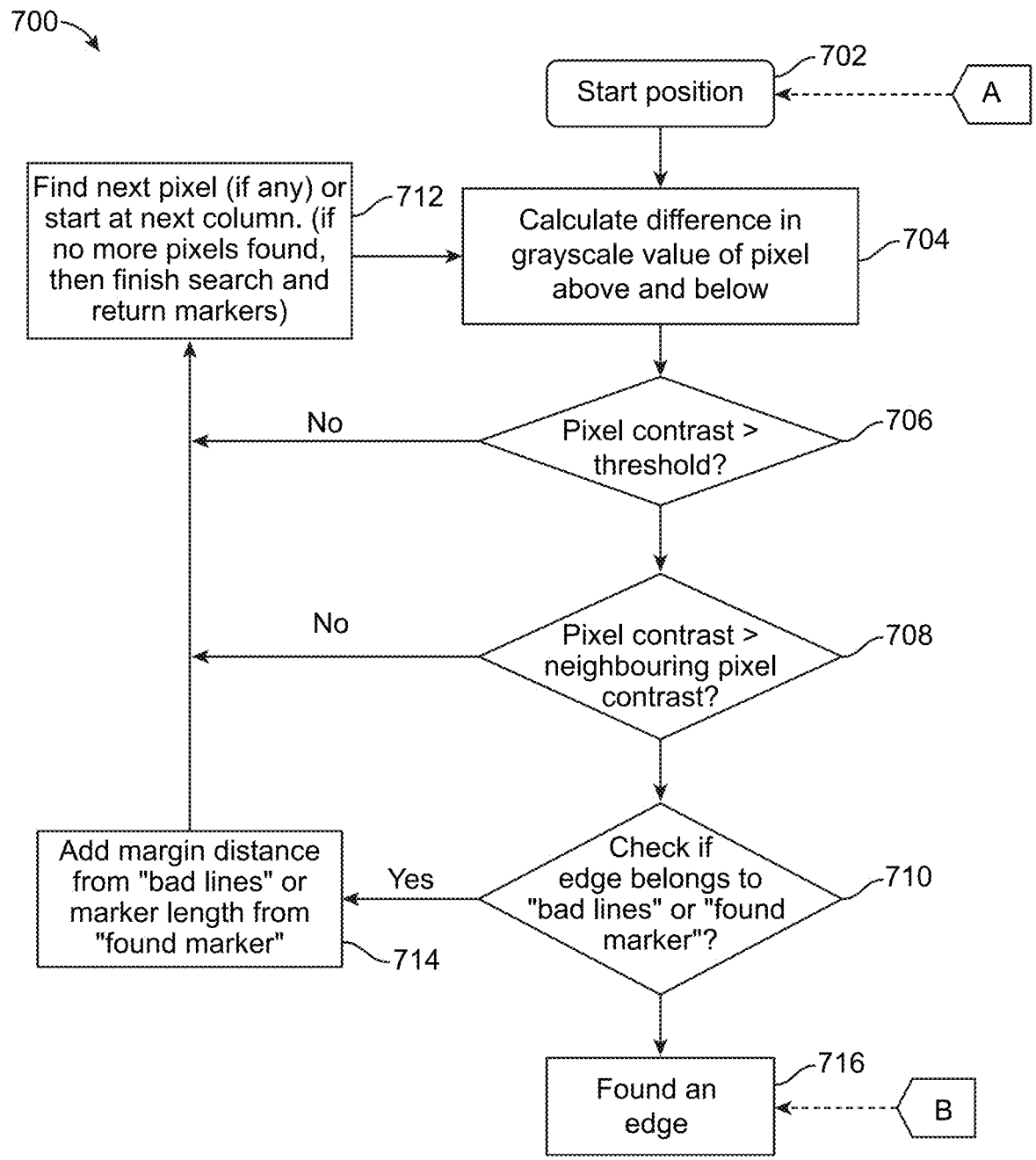
FIG. 7 illustrates method of edge detection, according to one embodiment of the present subject matter.

A method of edge detection is illustrated in a flowchart as shown in FIG. 7, according to an embodiment of the present subject matter. The method 700 may include traversing from the starting position 702 to determine a difference in the greyscale values of the pixels and the neighboring pixels at block 704. The difference in the pixel values indicate a pixel contrast and the pixel contrast is compared with a threshold contrast at block 706. If the pixel threshold contrast is greater than the threshold contrast, then the pixel contrast is compared with a neighboring pixel contrast at block 708. If the pixel contrast is greater than the neighboring pixel contrast, it is determined whether the edge belongs to "bad lines" or "found marker" at block 710. If the pixel contrast is not greater than the threshold or neighboring pixel contrast, then the next pixel or the next column is checked at block 712. If there are no pixels remaining for checking, then the search is completed and markers are returned. In some embodiments, the "bad lines" may include a set of lines or edges that do not match to form a marker. The bit decoding of such edges do not match. If the edge belongs to "bad lines", then a margin distance may be added and if the edge belongs to "found marker" then a marker length may be added at block 714. If the edge does not belong to the "bad lines" or "found marker" then the edge may be a final edge of the marker at block 716.

Figure 8:
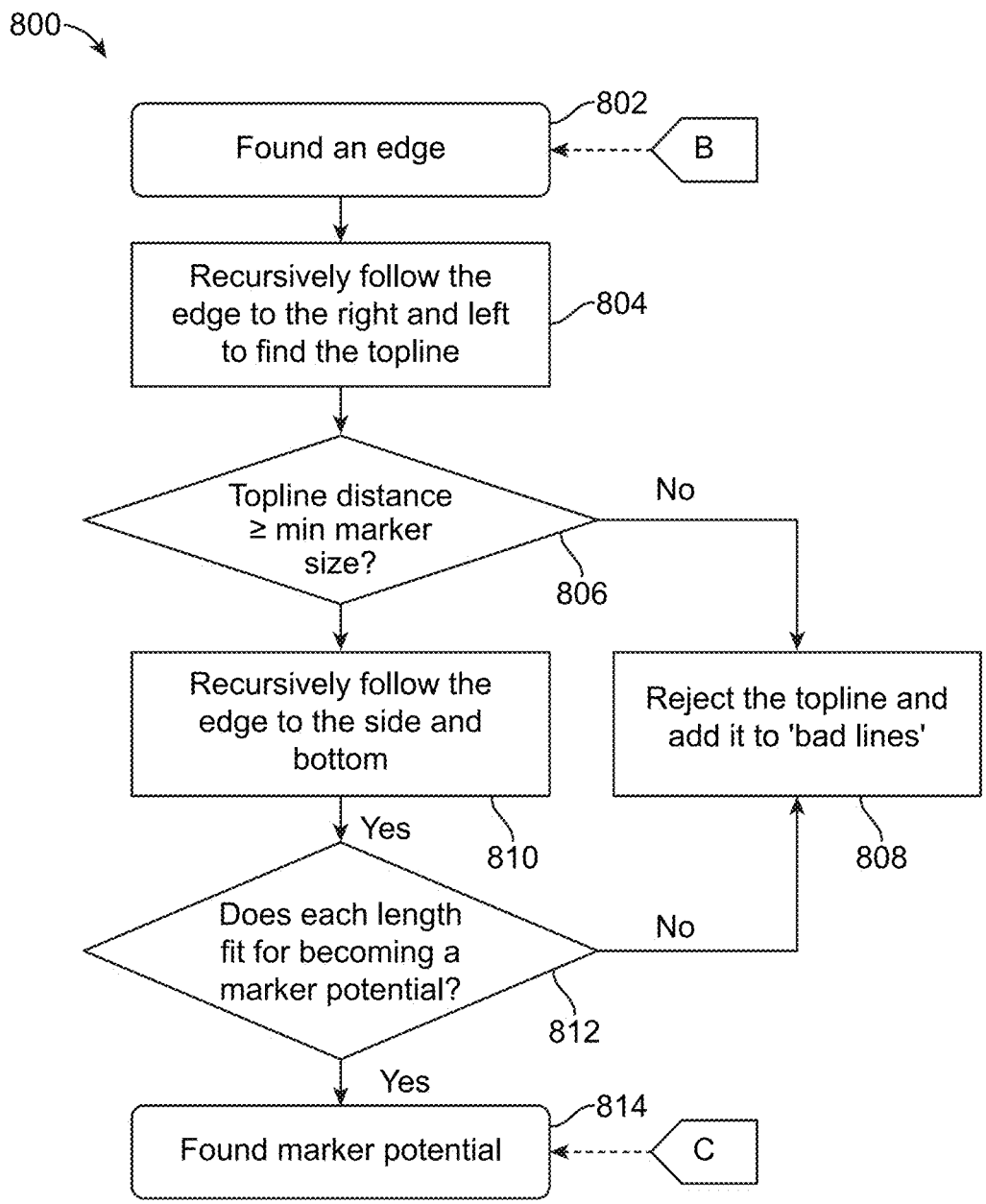
FIG. 8 illustrates method of identifying a potential marker, according to one embodiment of the present subject matter.

A method of identifying a potential marker is illustrated in a flowchart as shown in FIG. 8, according to an embodiment of the present subject matter. The identified final edges in the image may be received at block 802. Each edge may be recursively followed to the right and the left to identify a topline of an AR tag marker in image at block 804. In some embodiments, the edges may be followed using non-maxima algorithm to find the most fitting line. The topline distance may be compared with a minimum marker length at block 806. If the topline marker is greater than or equal to the minimum marker length, then the edges are recursively followed to obtain the side and bottom edges of AR tag markers at block 808. In some embodiments, if the topline distance is less than the minimum marker length, the method may go back to finding the next edge. In some embodiments the bottom right corner may be identified by following a bottom-line from the bottom left corner. The lengths of each of the edges of the marker are compared with the predetermined marker length to determine whether the edges are fit for becoming a marker potential at block 810. If the lengths are not fit for becoming a marker potential, then the edges are rejected and added to "bad lines". In various embodiments the identified lines are connected to obtain a potential marker at block 814.

Figure 9:
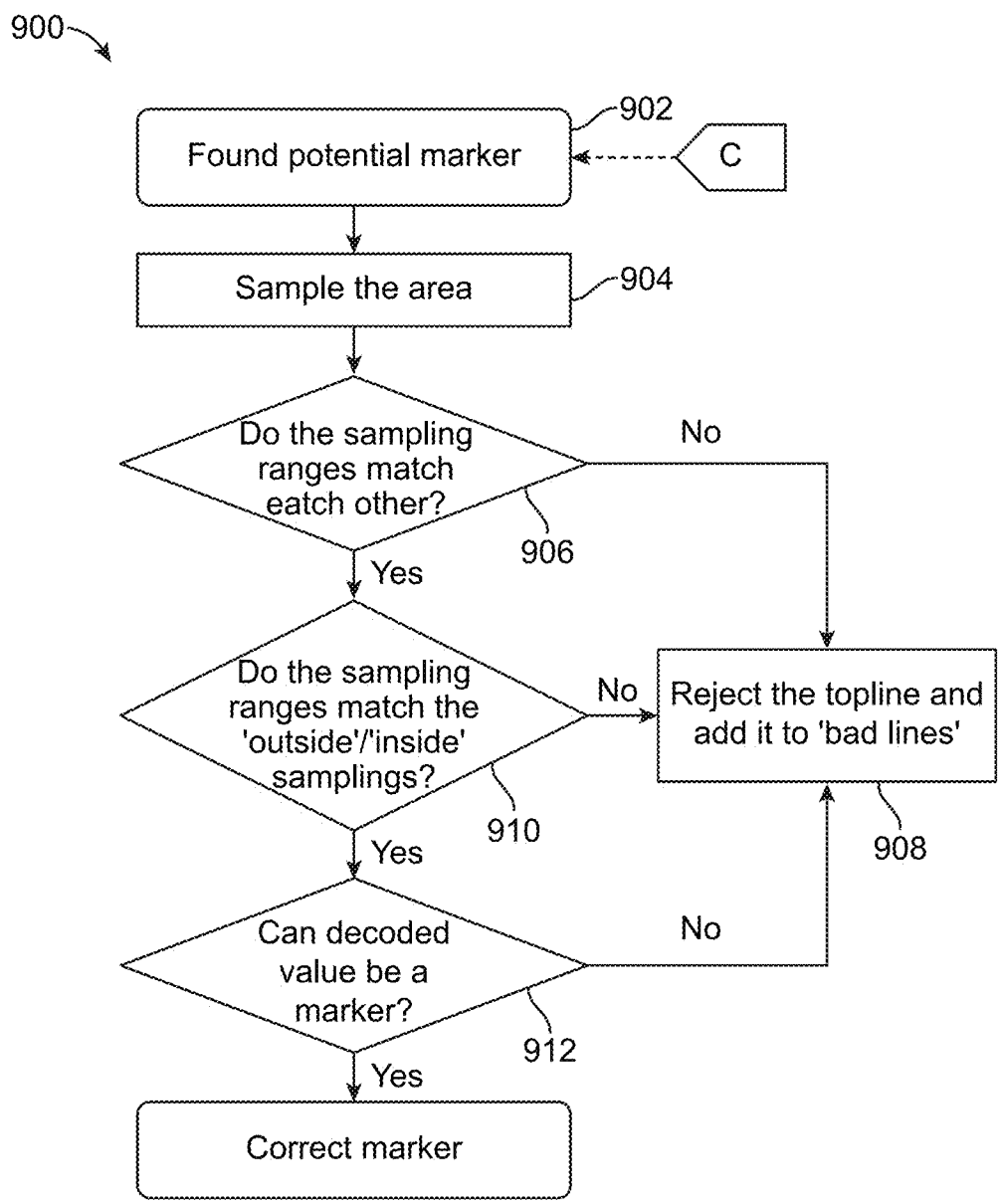
FIG. 9 illustrates method to identify AR tag markers from the potential markers, according to one embodiment of the present subject matter.
Figure 10:
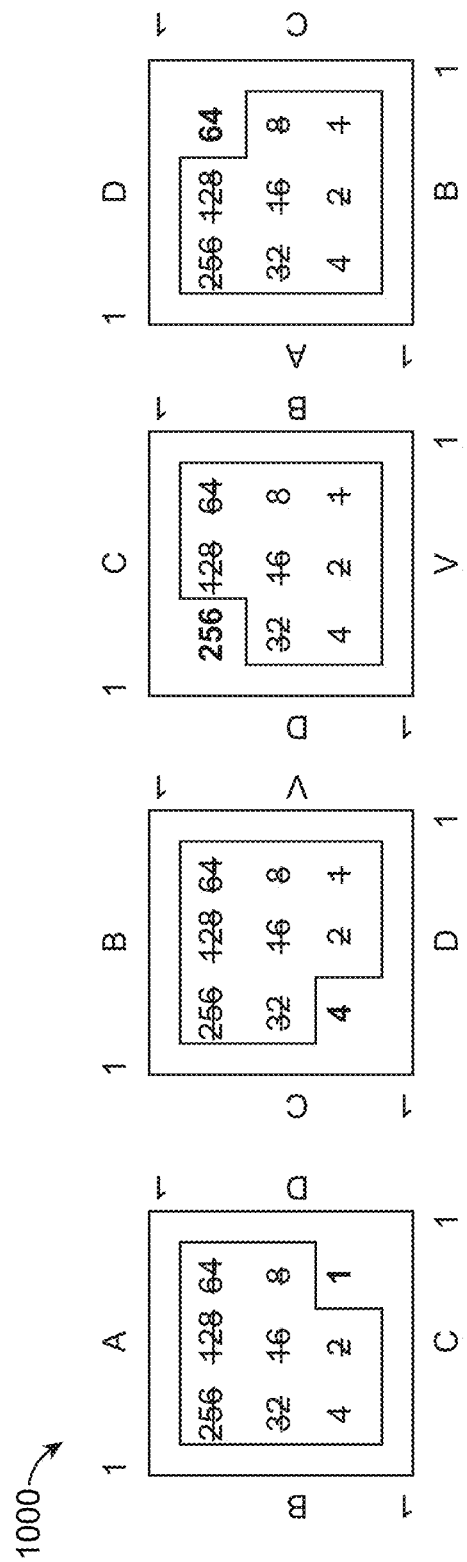
FIG. 10 illustrates AR tag marker of a user in different orientations, according to one embodiment of the present subject matter.

A method to identify AR tag markers from the potential markers is illustrated in FIG. 9, according to an embodiment of the present subject matter. The method 900 includes receiving identified potential markers at block 902. The marker areas of the identified potential markers may be sampled at block 904. In the next step, the sampling ranges of the marker areas are checked whether they match each other at block 906. If the sampling ranges do not match each other, then the topline of the identified potential markers are rejected and added to "bad lines" at block 908. If the sampling ranges match each other, then the sampling ranges of the marker printed on white paper may be compared with white color outside the marker on the white paper at block 910. Similarly, the regions with bit values of 1 (black region) may also be used for comparison. For instance, the bits found as "1" may be compared to be within the range of the edge of the marker itself. If the sampling ranges do not match, then the topline of the AR marker are rejected and if the sampling ranges match, then the potential marker is decoded at block 912. In various embodiments, the decoding may be performed by decoding binary bit areas in each of the one or more potential markers based on the position of the most significant bit and the least significant bit in the AR tag markers. For instance, the most significant bit may be in top left and least significant bit in bottom right of the marker area. The AR tag marker of a user in different orientations is illustrated in FIG. 10, according to an embodiment of the present subject matter. Each orientation of the AR tag marker indicates a polling option associated with the poll. In some embodiments, the black bit area in the first orientation may indicate the user identifier associated with the user. A table illustrating the values associated with a decoded marker area in an AR tag marker for 63 distinct marker IDs is provided. The first column represents marker ID. The remaining four columns represent the 4 different values this marker may take on for the 4 different answers 'A', 'B', 'C', and 'D'.

TABLE 1

The Decoded Values On The Marker Area For Each Option Associated Marker Ids

| Marker ID | Option "A" | Option "B" | Option "C" | Option "D" |
|---|---|---|---|---|
| 1 | 1 | 4 | 256 | 64 |
| 2 | 2 | 32 | 128 | 8 |
| ... | ... | ... | ... | ... |
| 62 | 98 | 161 | 140 | 266 |
| 63 | 99 | 165 | 396 | 330 |

Figure 11A:
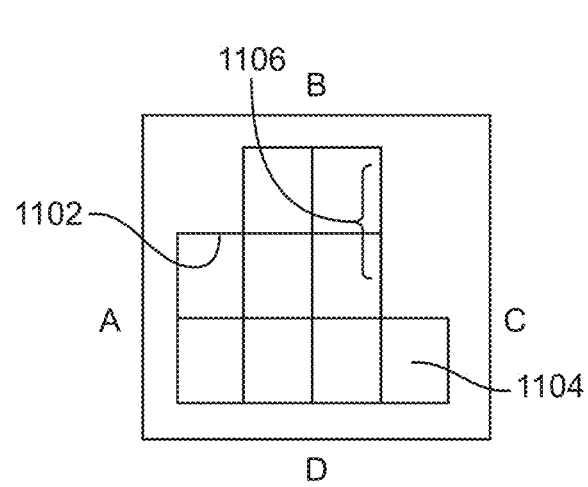
FIGS. 11A and 11B illustrate different orientations of a 3×4 marker, according to an embodiment of the present subject matter.
Figure 11B:
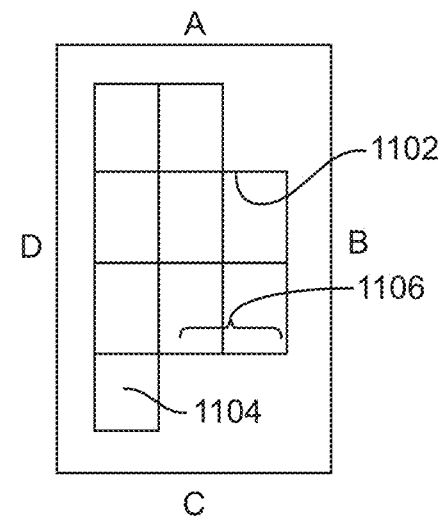

In some embodiments, the AR tag markers may be extended to support beyond 63 unique markers. For instance, the marker may include a 4×4 encoding grid instead of a 3×3 encoding grid. An AR tag marker with a 4×4 may be created by extending increasing space for the marker area by a factor of ¼. However, 4×4 markers require the marker size to be ⅓ times larger than 3×3 markers. In various embodiments, AR tag markers with encoding grids comprising a 3×4 marker area may be used. In various embodiments, the decoding of the 3×4 markers may be performed using pair of anchors. The anchor pair may include one black bit area and one white bit area for indicating the orientation of such markers. For instance, the anchor pair may occupy the top-left corner bit and bottom-right corner bit, or the top-right corner bit and the bottom-left corner bit. An example 3×4 marker of a student is illustrated in FIG. 11A and FIG. 11B, according to one embodiment of the present subject matter. The bit region of the marker includes a black anchor 1102, a white anchor 1104, and black bits 1106. The position of the black anchor 1102 and white anchor 1104 may be used to identify the orientation of the marker, which indicates the option selected by the student. A first orientation of the marker, as illustrated in FIG. 11A, corresponds to option "B" and a second orientation of the marker corresponds to option "A", as illustrated in FIG. 11B. The black bits 1106 of the marker indicate the student identifier. In various embodiments, the least significant bit value (i.e. "1") in the bit region is adjacent to the white anchor 1104 and the most significant bit value (i.e. "512") may be adjacent to the black anchor 1102. For instance, the student identifier may be "3" (1+2=3) in the marker illustrated in FIGS. 11A and 11B.

Further, in various embodiments, the student identifiers may be mapped randomly to the different orientations. For instance, student 1 may have option "A" and "C" in horizontal orientation and student 2 may have option "A" and "C" in vertical position. In another embodiment, the order of the options with respect to the marker orientations may be scrambled. For instance, the order of the options may be BCAD in one marker, while it may be DACB in another marker. The random mapping and option scrambling embodiments obviates practical problems, such as copying of the marker orientations chosen by other students. The 3×4 marker may have the same size/minimum marker size/resolution as the 3×3 marker. In some embodiments, two 3×4 markers may be printed on an A4 sheet. Therefore, printing 3×4 markers may not change the range that the device may work under. Additionally, 3×4 markers provide $2^{10}-1=1023$ unique variations, which is a factor of 16 times more markers compared to 3×3 markers, after accounting for possible symmetry in markers.

Figure 12:
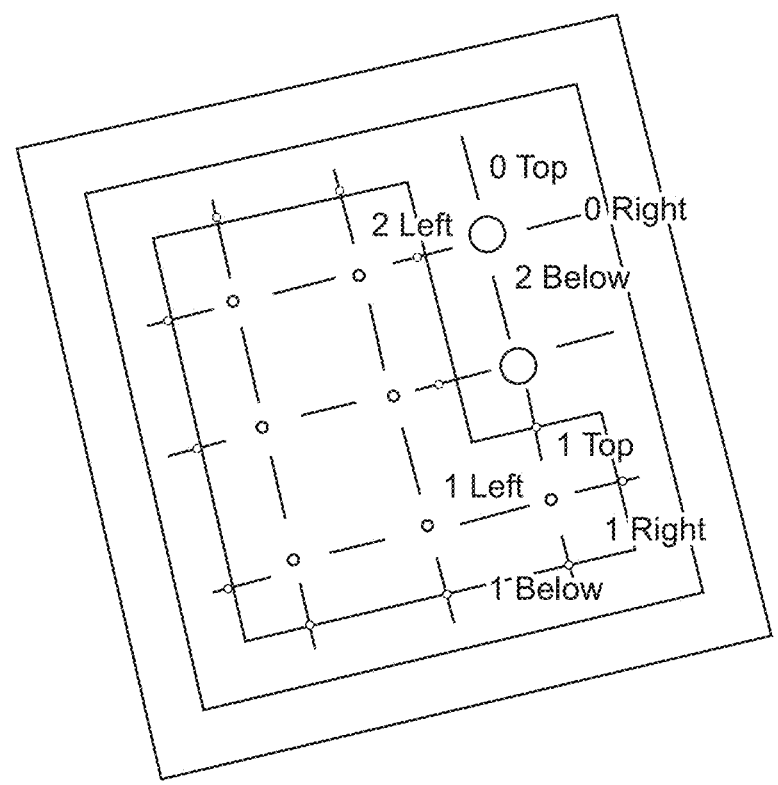
FIG. 12 illustrates position of the center of the bit representation in AR tag marker, according to one example of the present subject matter.

In some embodiments, decoding may include one or more error corrections in addition. In some embodiments, given the corners of the marker that indicate angles and size of the marker, the position of the edges could be calculated. The position of the center of the bit representation may be calculated to find if it is within or outside the black area. This may be done in 4 independent directions namely up, down, left and right as illustrated in FIG. 12. If the number of edges detected on one side is even then the bit representation is within the black area and therefore represented as 0. If on the other hand if the number of edges on the side is odd, then the bit has transitioned from black to white and hence the bit representation is outside the black area, i.e., within the white area and therefore represent as 1. The top portion is first checked to find if the bit value matches the sampling values. If the marker fits the previously found calculation then the checking is proceeded downwards and so on. If the marker doesn't fit the previous found calculations the whole marker is discarded without checking further. In some embodiments, calculating the histogram value of the bits may give a clear clue of how many '1's and '0's are there within the marker.

Figure 13:
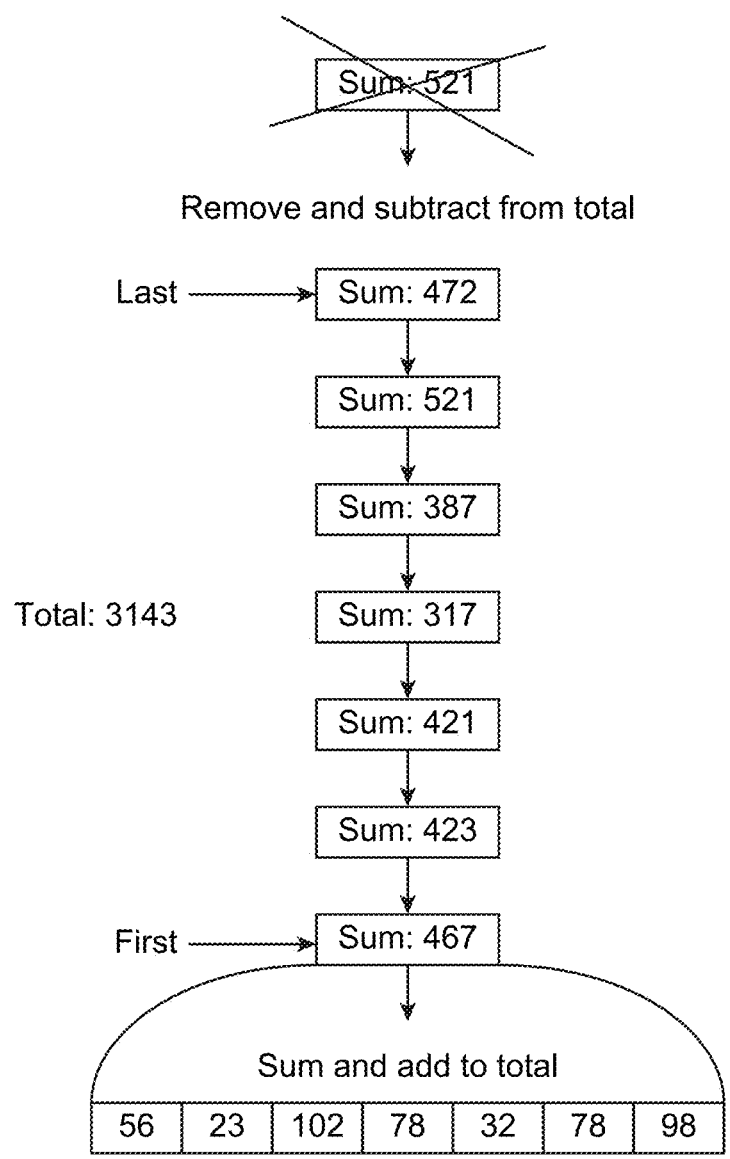
FIG. 13 illustrates simple continuous calculation of a 7×7 value around the pixel that is thresholded, according to one example of the present subject matter.

In various embodiments, adaptive thresholding highly improves finding markers in even bad lighting conditions. A simple linked list as shown in FIG. 13 may be used to calculate values around the pixel during the actual search. A simple continuous calculation of a 7×7 value around the pixel that is thresholded is illustrated in FIG. 13. In various embodiments, the threshold values used in detection of first edge of the potential marker may be used for the rest of the potential marker as the marker may be homogeneously lighted. In some embodiments, the adaptive thresholding may be used around the potential marker with little more cost of efficiency. Both the embodiments are cheaper than calculating the Integral Image for the whole image and then getting the 7×7 around the pixel as only a small fraction of pixels are needed while looking for markers between each $x^{th}$ column.

EXAMPLES

An image of a plurality of AR tag markers is illustrated in FIG. 14, according to an example of the present subject matter. The image was processed to include a plurality of columns separated by length less than the predetermined marker length. The image was used as an input to the method and system as described earlier for identifying the AR tag markers. The edges of the markers were identified in the image by traversing the image from top to bottom to find any horizontal edges. Upon identifying a horizontal edge, the edge was followed recursively to the corner edges to obtain a line. The gray vertical lines as shown in FIG. 15 are where the method looked for edges. The yellow dot indicates where the marker edge was first detected. Upon succeeding detections of the same edge the method finds the edge belonging to an already found marker and thus skips till the end of the marker. When an identified pixel belongs to 'Found Marker' a marker length was added to the identified pixel to proceed to the next input pixel.

A non-maximum suppression filter was applied to the identified horizontal edges. The contrast of the pixels of the edges is compared with a threshold value and the contrast of the neighboring pixels. The blurry contrast with non-maximum suppression is illustrated in FIG. 16, according to an example of the present subject matter. The orange pixels indicate where the contrast value is above the threshold but not higher than their neighbors. The red pixel represents the pixel with higher contrast values than both its neighbors and therefore the highest contrast value in the edge area.

Figure 17:
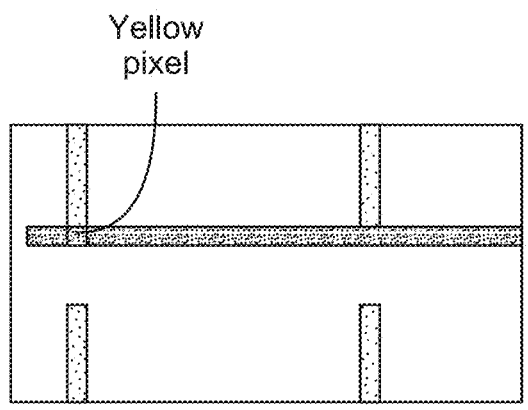
FIG. 17 illustrates an image identifying a pixel belonging to 'bad line', according to one example of the present subject matter.
Figure 18:
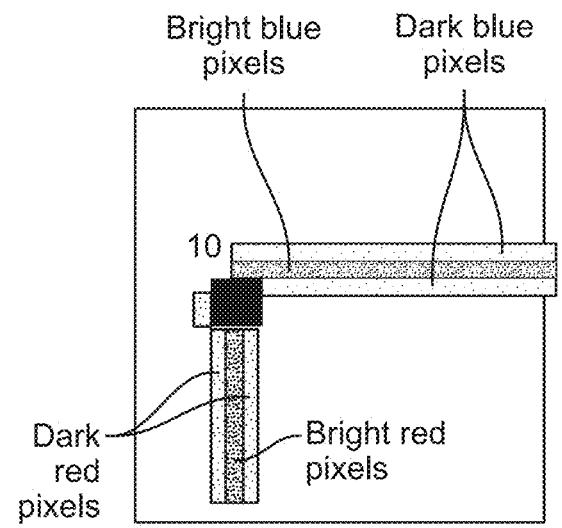
FIG. 18 illustrates an image with non-maximum suppression in recursively following edges, according to one example of the present subject matter.

The identified edges are recursively followed horizontally to the right and to the left to find the topline of the marker. Further the identified pixels were classified as either belonging to 'Bad lines' or 'Found marker'. 'Found markers' are pixels that are nearby the identified edge and not far off in other part of the image. Upon identifying a pixel (yellow) belonging to 'bad line' as shown in FIG. 17 the method may add a margin distance to the pixel to make sure that the same edge is not detected again. If the found topline is greater than the minimum marker length the topline is recursively followed to identify the top line corners, the side lines and the bottom corners. The bottom right corner may be identified by following the bottom-line from the bottom left corner. If the topline is smaller than the set marker-length the identified line is classified as 'Bad line'. Each identified new line was checked to find if the new line fits with the other lines in length. The identified lines are connected to form a potential marker. Additionally, a 'corner-filter' was used to count up the fitness for a certain corner in the marker area and then recursively call the fitness function for all its neighboring pixels as illustrated in FIG. 18 to confirm that the pixel has better fitness than its neighbors. The bright blue and red represent the highest contrast value while the darker representatives represent lower contrast values.

Figure 19:
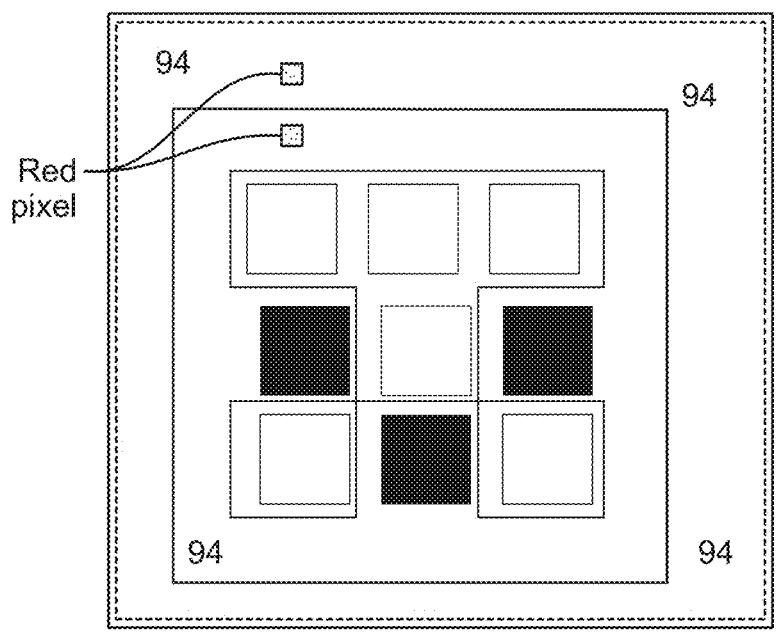
FIG. 19 illustrates an image with red pixels representing 'Inside/outside'-sampling areas, according to one example of the present subject matter.

Further, the identified potential marker was sampled to obtain sampled bit areas. The sampling ranges were compared to find if they match each other, i.e., close to the darkest or brightest area. If the sampling ranges did not match each other the topline is rejected and classified as 'Bad lines'. This simple check removes most squares that consist of more varied texture. Further the sampling ranges were checked to find if the samplings match the outside or inside samples as shown in FIG. 19. The check is based on the criteria that the marker will be printed on white paper where the white should be the same outside the marker square as well as the sampled 'white bits'. And the black which is just within the square area should have close to the same sampling range as the sampled 'black bits'. The pixels that were found to be outside the sampling area is represented as red as shown in figure. Thus with this check the randomly found squares that do not match with the sampling value are rejected. The sampled areas are further converted to binary codes and then decoded to represent each marker as an integer.

Figure 20:
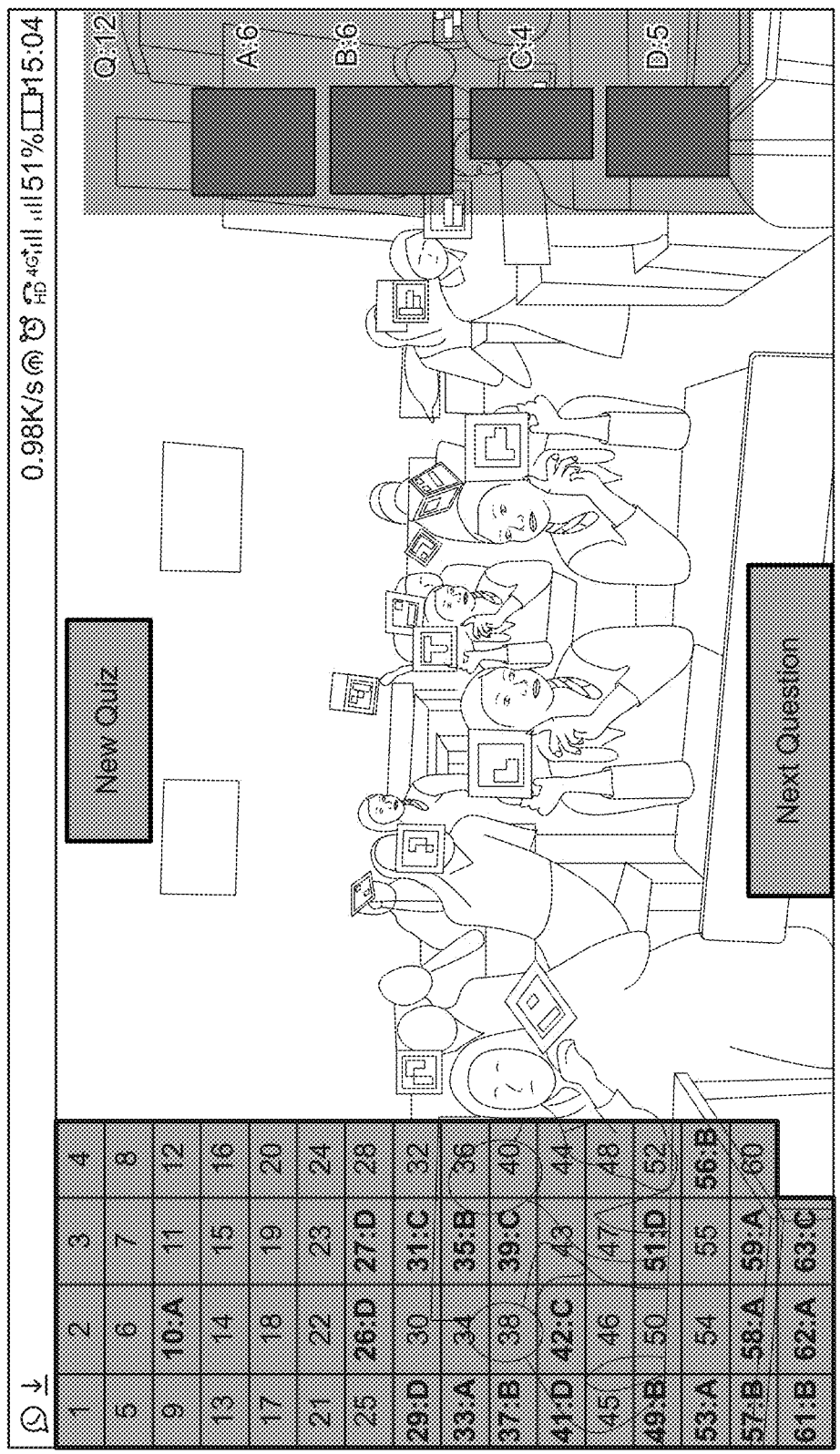
FIG. 20 illustrates a user interface displayed at the pollster system, according to one example of the present subject matter.
Figure 21A:
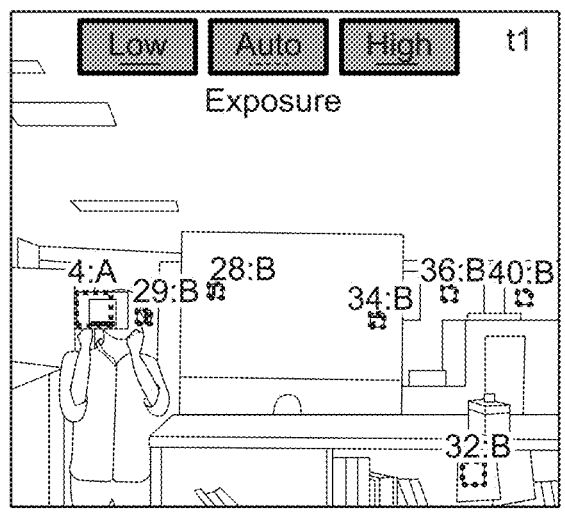
FIG. 21A-21D illustrates time lapse images of an exemplary pollster system, according to another example of the present subject matter.
Figure 21B:
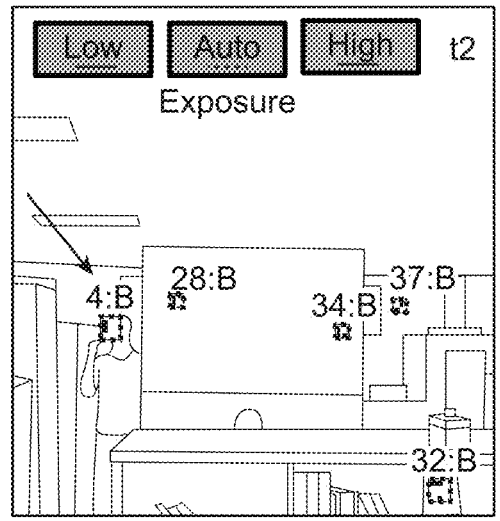
Figure 21C:
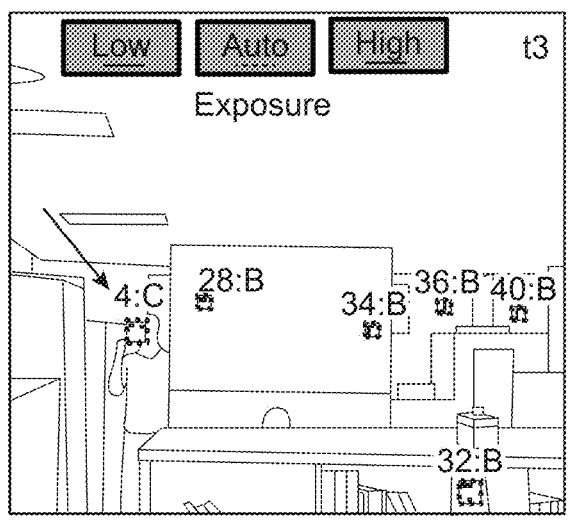
Figure 21D:
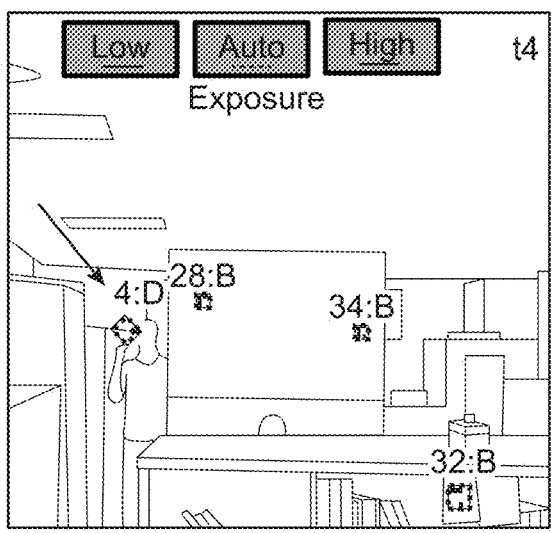

An example of a user interface displayed at the pollster system is illustrated in FIG. 20, according to one example of the present subject matter. As shown, a camera unit was used for capturing the responses of students in a classroom. The captured image was communicated to the polling server for processing the image for marker identification and response assessment. The user interface includes the image or real-time streaming of the students displaying the AR tag markers. The response and the marker ID of the students is displayed on the left hand side of the user interface. Additional information, such as response summary, is included on the right hand side of the user interface.

Another example of the optical polling platform according to the embodiments of the invention is illustrated in FIG. 21A-D. The pollster system includes a mobile phone installed with an application to detect the AR tag markers through the mobile phone's camera unit. As shown in FIG. 21A-D, the user interface of the application detects the AR tag markers placed at various locations relative to the camera at a near real-time as shown as time lapse images from a captured video. The system accurately detects the poll options at a near real-time and provides a summary of the class score as described in the previous examples. The system was configured to auto-adjust the exposure levels. Alternatively, a manual variance of the exposure levels may be performed by selection in the application. The user interface also provides other options, such as switching over to next question, etc. The AR tag markers held by a volunteer was detected as user id: 4 and option: A by the system at a time t1. The volunteer moved away from the camera to a different location and adjusted his polling option at time t2 which was detected correctly as option: B. Similarly, options C and D were accurately detected for the volunteer's response at a near real-time by the mobile application.

The above subject matter and its embodiments provide identification of AR tag markers from images captured by an optical polling system. The methods and system described herein are reliable. The processing of the images using the above methods improves the efficiency of the system and enables pollsters to effectively carry out polls. The system is configured to capture AR tag markers from larger distances for similar sized markers compared to other types of markers. Additionally, the AR tag markers are easy to create and inexpensive, which promotes implementation of the learning management systems in remote and distant locations, such as by using an application installed to a connected mobile computing device. Further, the present subject matter may be used in various fields, such as for educational purposes, conferences, speeches, and other communication ways over video communication.

Although the detailed description contains many specifics, these should not be construed as limiting the scope of the invention but merely as illustrating different examples and aspects of the invention. It should be appreciated that the scope of the invention includes other embodiments not discussed herein. Various other modifications, changes and variations which will be apparent to those skilled in the art may be made in the arrangement, operation and details of the system and method of the present invention disclosed herein without departing from the spirit and scope of the invention as described here. While the invention has been disclosed with reference to certain embodiments, it will be understood by those skilled in the art that various changes may be made and equivalents may be substituted without departing from the scope of the invention.

What is claimed is:

1. A computer-implemented optical polling method comprising:
    receiving an image of augmented reality (AR) tag markers associated with a poll, wherein each AR tag marker is encoded with data, the data comprising a user identifier and a polling option;
    processing the image to identify the AR tag markers, wherein the processing comprises:
    detecting a first set of edges in the image by traversing vertically along a plurality of columns in the image, wherein the columns are separated by a predetermined length;
    identifying final edges from the detected first set of edges based on contrast in pixels of the detected first set of edges and associated neighboring pixels;
    identifying potential AR tag markers in the image based on a length of the identified final edges;
    identifying AR tag markers from the identified potential AR tag markers by sampling bit areas in each of the obtained potential AR tag markers; and
    decoding the AR tag markers to determine user identifier and polling option selected by the user identifier.

2. The method of claim 1, wherein the predetermined length is less than or equivalent to a minimum AR tag marker length in the image.

3. The method of claim 1, wherein the detecting the first set of edges comprises:
    i. identifying an edge by traversing every $x^{th}$ column in the image, wherein "x" is minimum AR tag marker length;
    ii. identifying a line by recursively traversing the identified edge to corners;
    iii. identifying side edges of the marker by traversing downwards from corners of the identified line; and
    iv. traversing horizontally from an identified bottom corner to another bottom corner.

4. The method of claim 1, wherein identifying the final edges comprises:
    i. accepting edge pixels having higher contrast than neighboring pixels; and
    ii. accepting edge pixels with contrast higher than a threshold value.

5. The method of claim 1, wherein identifying potential AR tag markers comprises:
    i. comparing the length of the final edges with a predetermined minimum AR tag marker length;
    ii. rejecting the final edges if the length is less than the predetermined minimum marker length; and
    iii. accepting the final edges if the length is greater than the predetermined minimum marker length to obtain the potential AR tag marker.

6. The method of claim 1, wherein identifying AR tag markers from the identified potential AR tag markers comprises:
    i. checking whether sampled bit areas are in the same range of either close to white or black color; and
    ii. checking whether the sampling value match with an actual sampling value.

7. The method of claim 1, wherein color of sampled bit area is one of black or white.

8. The method of claim 1, wherein decoding the AR tag markers comprises:
    i. determining a binary code for each of sampled bit areas based on the color of the sampled bit area; and
    ii. decoding the binary bit areas in each of the potential AR tag markers based on the position of the most significant bit and the least significant bit in the AR tag markers.

9. The method of claim 1, further comprising identifying the AR tag markers in poor lighting conditions using adaptive thresholding.

10. The method of claim 1, further comprising calculating position of center of the bit representation to check whether the center is within or outside the edges.

11. The method of claim 1, wherein the processing further comprises splitting the received image into multiple parts prior to finding a first set of edges.

12. An optical polling system, comprising:
    a camera unit configured to capture an image of augmented reality (AR) tag markers, wherein each AR tag marker is encoded with data, the data comprising a user identifier and a polling option;

a computing device for evaluating and assessing responses, the computing device comprising:
a processing unit;
a memory unit coupled to the processing unit, wherein the memory unit comprises:
an image reception module configured to receive the image of AR tag markers;
an edge detection module configured to detect a first set of edges in the image by traversing vertically along a plurality of columns in the image, wherein the columns are separated by a predetermined length;
an edge filtering module configured to identify final edges from the detected first set of edges based on contrast in pixels of the detected first set of edges and associated neighboring pixels;
a marker identification module configured to identify potential AR tag markers based on a length of the identified final edges, and identify AR tag markers from the identified potential AR tag markers by sampling bit areas in each of the obtained potential AR tag markers; and
a decoding module configured to decode the AR tag markers to determine user identifier and polling option selected by the user identifier.

13. The system of claim 12, wherein the memory unit further comprises a summary generation module configured to generate a summary of the response of each user.

14. The system of claim 12, wherein the memory unit further comprises a learning module configured to provide a plurality of subject courses.

15. The system of claim 12, wherein the decoding module is configured to:
determine a binary code for each of sampled bit areas based on the color of the sampled bit area; and
decode the binary bit areas in each of the potential AR tag markers based on the position of the most significant bit and the least significant bit in the AR tag markers.

16. The system of claim 12, further comprising a second computing device communicatively coupled to the computing device over a network.

17. The system of claim 12, wherein the system is configured to decode AR tag markers at a near real-time.

18. The system of claim 12, further comprising a plurality of user devices for responding to poll, wherein the user devices display the AR tag marker indicating a user identity and user response.

19. The system of claim 12, wherein the camera unit is configured to adjust the exposure time based on an average grayscale value of the image.

20. The system of claim 12, wherein the memory unit further comprises an image splitting module configured to split the received image prior to finding a first set of edges.

* * * * *